United States Patent [19]
Rasmussen

[11] 3,814,367
[45] *June 4, 1974

[54] CUP HOLDER FOR AUTOMOBILE
[76] Inventor: Lester M. Rasmussen, 1361 Kensington Rd., Kankakee, Ill. 60901
[ * ] Notice: The portion of the term of this patent subsequent to Dec. 26, 1989, has been disclaimed.
[22] Filed: Sept. 29, 1972
[21] Appl. No.: 293,330

Related U.S. Application Data
[63] Continuation-in-part of Ser. No. 38,746, May 19, 1970, Pat. No. 3,707,272.

[52] U.S. Cl. ............... 248/311, 211/71, 211/88
[51] Int. Cl. ............................................. A47c 7/70
[58] Field of Search .......... 248/309, 311, 314, 315, 248/215, 210, 211, 216; 211/71, 74, 77, 76, 88, 106; 108/46; 224/42–45 R

[56] References Cited
UNITED STATES PATENTS
| | | | |
|---|---|---|---|
| 1,765,267 | 6/1930 | Hartman | 248/315 X |
| 1,782,962 | 11/1930 | Hobbs | 248/313 X |
| 2,534,169 | 12/1950 | Hope | 211/49 D UX |
| 3,031,162 | 4/1962 | Whorton | 248/311 X |
| 3,184,201 | 5/1965 | Smith | 248/311 |
| 3,193,232 | 7/1965 | Hatcher | 248/311 X |
| 3,637,184 | 1/1972 | O'Brien | 248/311 X |
| 3,707,272 | 12/1972 | Rasmussen | 211/75 |

FOREIGN PATENTS OR APPLICATIONS
319,304   11/1902   France ........................ 248/311

Primary Examiner—J. Franklin Foss
Attorney, Agent, or Firm—Prangley, Dithmar, Vogel, Sandler & Stotland

[57] ABSTRACT
A cup holder includes a retaining ring having a pair of mounting arms extending substantially radially outwardly therefrom, the outer ends of the arms diverging and terminating respectively in downwardly extending prongs for insertion between the window pane and the inner ledge of an automobile door, a substantially diamond-shaped brace member slidably mounted on the mounting arms for movement therealong and into engagement with the inner surface of the automobile door, the brace member cooperating with the prongs for securely holding the carrier in place on doors of various thicknesses, and an integral flexible bottom support including a pair of hanger members respectively secured to the retaining ring at diametrically opposed points thereon and depending therefrom and interconnected at the lower ends thereof by a generally inverted U-shaped cross member resiliently displaceable to accommodate different sizes and weights of cups. A flanged rigid container may be hung within the retaining ring for accommodating the associated cup therein.

13 Claims, 5 Drawing Figures

PATENTED JUN 4 1974　　　　　　　　　　　　　　3,814,367

CUP HOLDER FOR AUTOMOBILE

This application is a continuation-in-part of my co-pending U.S. Pat. application Ser. No. 38,746, filed May 19, 1970, and entitled CUP HOLDER FOR AUTOMOBILES, now U.S. Pat. No. 3,707,272, issued Dec. 26, 1972.

The present invention relates to a cup holder or carrier for use in automobiles and, more particularly, to an improved type of cup holder mountable on the inside of an automobile door for supporting cups of beverage and the like.

It is a general object of the present invention to provide an improved cup holder having improved bottom support and bracing means.

It is an important object of the present invention to provide a carrier for a cup or the like adapted to be detachably mounted on an automobile door having a door panel and a window pane disposed on one side of the panel and spaced a predetermined distance therefrom, the carrier comprising a receptacle disposed in use for receiving and supporting therein an associated cup in an upstanding condition, a mounting arm disposed in use substantially horizontally and having an inner end coupled to the receptable and a free distal end disposed away from the receptacle, a prong connected to the arm adjacent to the distal end thereof and extending downwardly therefrom, and a brace member slidably coupled to the arm intermediate the ends thereof and including a pair of generally V-shaped spacedapart legs extending downwardly therefrom and disposed in a substantially diamond-shaped configuration, the brace member being movable longitudinally with respect to the arm for varying the spacing between the brace member and the prong, the carrier having a mounted configuration with the arm overlying the associated door panel and with the prong inserted downwardly between the window and the one side of the associated door panel and with the receptacle disposed on the opposite side of the associated door panel, the brace member being movable into engagement with the opposite side of the associated door panel for cooperation with the prong to accommodate the associated door panel therebetween, whereby the carrier may be firmly mounted on automobile doors having panels of varying thickness by appropriate adjustment of the position of the movable brace member.

Another object of the present invention is to provide a carrier of the type set forth, wherein the receptacle comprises a retaining ring disposed in use substantially horizontally and a flexible and resilient bottom support member coupled to the ring at diametrically opposed points thereon and extending therebeneath for supporting engagement with the bottom of an associated cup disposed within the retaining ring to provide the sole bottom support therefor.

Still another object of this invention is to provide a carrier or the type set forth, which further includes a container having a generally cylindrical side wall and an end wall closing the side wall at one end thereof and an annular flange extending outwardly from the side wall substantially normal thereto adjacent to the other end thereof, the container having an operative configuration with the cylindrical side wall disposed within the retaining ring substantially coaxially therewith and with the mounting flange overlying the retaining ring in engagement therewith for supporting the container on the retaining ring, whereby the retaining ring and the container cooperate to provide a closed receptacle for supporting the associated cup in upstanding condition therein.

Further features of the invention pertain to the particular arrangement of the parts of the carrier whereby the above-outlined and additional operating features thereof are attained.

The invention, both as to its organization and method of operation, together with further objects and advantages thereof, will best be understood by reference to the following specification taken in connnection with the accompanying drawings, in which.

Figure 1:
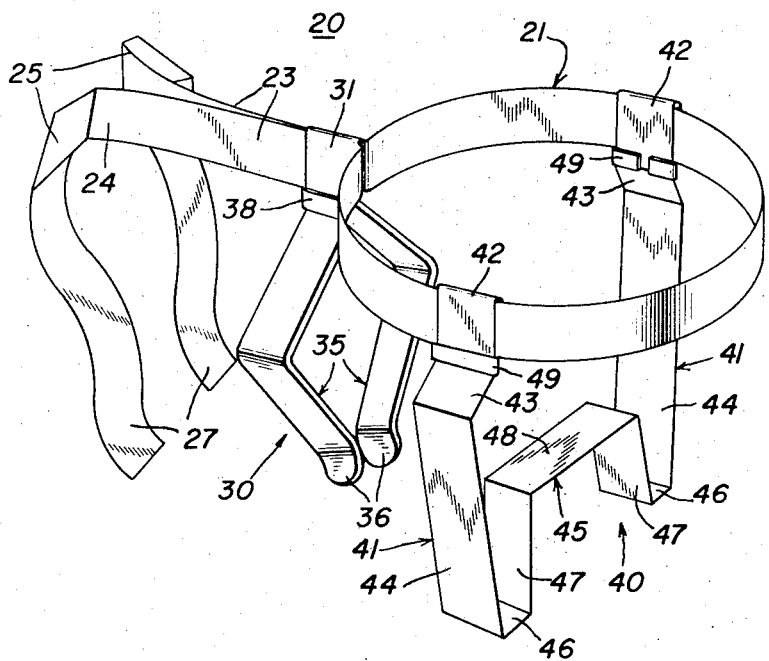
FIG. 1 is a front perspective view of a cup holder or carrier constructed in accordance with and embodying the features of the present invention.
Figure 3:
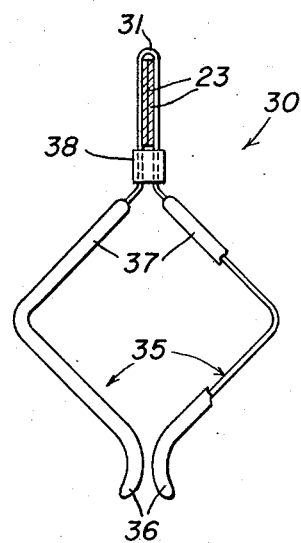
FIG. 3 is a view in vertical section taken along the line 3—3 in FIG. 2 and illustrating the brace member for the cup holder.
Figure 2:
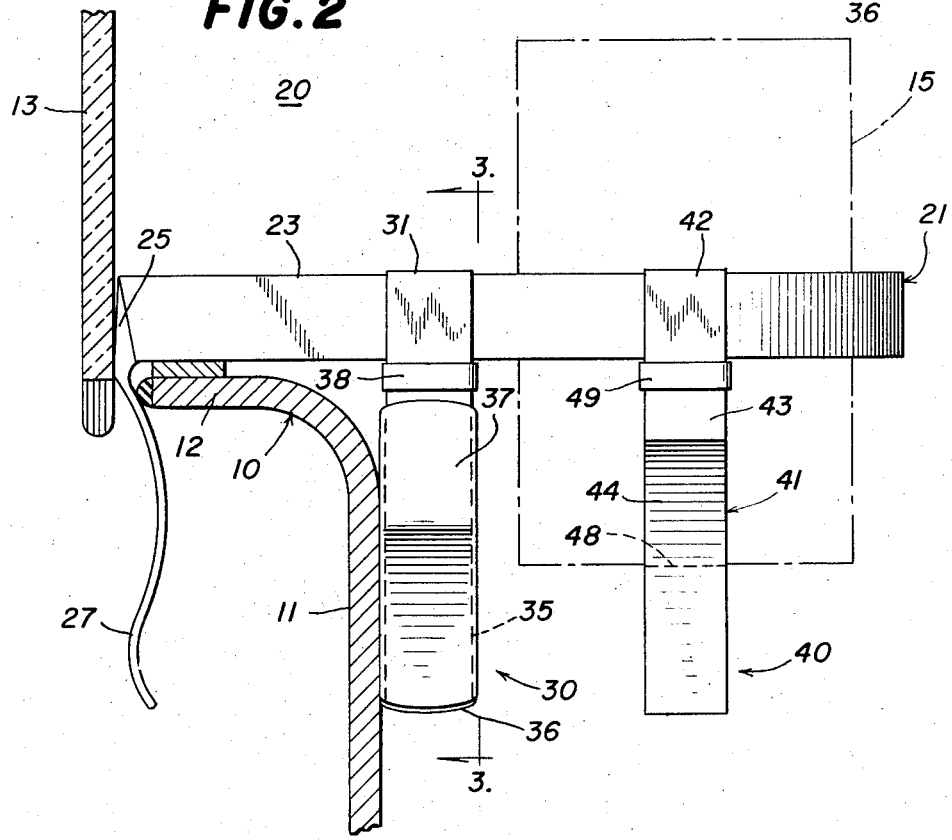
FIG. 2 is an enlarged side elevational view of the cup carrier illustrated in FIG. 1, with the carrier shown in its mounted position on the inner panel of an automobile door, and illustrating the position of a cup carried in the carrier.

Referring now to FIGS. 1 through 3 of the drawings, there is illustrated a cup carrier or holder, generally designated by the numeral 20, constructed in accordance with and embodying the features of the present invention and adapted to be mounted on the inner panel of an automobile door, generally designated by the numeral 10. The door panel 10 includes a vertically extending inner side wall 11 terminating at the upper end thereof in an outwardly extending top ledge 12. A door window pane 13 is mounted in the door adjacent to the outer edge of the ledge 12 in the usual manner for movement between an upper closed position and a lower open position.

The cupholder 20 comprises primarily a single piece of flexible resilient material, such as an elongated strap of spring steel, the central portion of which is bent to form a substantially circular retaining ring 21 and the end portions of which are bent to form a pair of mounting arms 23 extending generally radially outwardly from the retaining ring 21. The mounting arms 23 are biased so that the outer ends thereof diverge, each of these ends being bent downwardly at an elbow portion 25 to form a downwardly extending prong 27, each of the prongs 27 being bent into a generally serpentine or recurved shape.

Carried by the mounting arms 23 is a brace member, generally designated by the numeral 30, and formed of another strip of flexible resilient material such as spring steel or the like. The central portion of this strip forming the brace member 30 defines a loop or bight 31 which is wrapped over the mounting arms 23, the outer ends of the brace member 30 respectively defining substantially V-shaped legs 35, the legs 35 being so disposed that the apices of the V's project laterally outwardly away from each other, whereby the V-shaped legs 35 cooperate to form a substantially diamond-shaped configuration. Each of the legs 35 terminates in a lower distal end 36 which is curved outwardly away from the other leg 35. Preferably, each of the legs 35 is covered with a padding material 37 which may, for example, be a plastic coating applied to the legs 35 while the plastic is in a liquid state by dipping the legs 35 thereinto.

In use, the legs 35 are held together by a metal band or clamp 38 which is wrapped around the upper ends of the legs 35 immediately beneath the mounting arms 23, thereby securing the brace members 30 in place on the mounting arms 23, while at the same time holding the inner ends of the arms 23 close together for maintaining the retaining ring 21 in its circular configuration and also for holding the distal ends 36 of the legs 35 closely adjacent to each other, as illustrated in FIG. 3. The clamp 38 is so set that the brace member 30 is slidably movable longitudinally with respect to the mounting arms 23 for varying the spacing between the legs 35 and the prongs 27, all for a purpose to be described more fully hereafter.

Also mounted on the retaining ring 21 is a bottom support member, generally designated by the numeral 40, and including a pair of depending hanger members, generally designated by the numeral 41 and a cross member, generally designated by the numeral 45. The bottom support member 40 is preferably formed of a single continuous strip of flexible resilient material such as spring steel or the like, with the central portion of the strip defining the cross member 45 and with the end portions of the strip defining the identically constructed hanger members 41. Each of the hanger portions 41 includes a top loop or fold 42 wrapped over the top of the retaining ring 21 and an elongated downwardly extending side portion 44, the loop portion 42 and the side portion 44 being interconnected by a short downwardly and outwardly inclined portion 43 immediately below the retaining ring 21. The cross member 45 is generally in the shape of an angular inverted U, and includes a pair of short substantially horizontally extending feet 46 integral with the side portions 44 at the lower ends thereof, a pair of inwardly and upwardly extending upright portions 47 respectively integral with the feet 46 and a flat substantially horizontally extending cross-strap or seat 48 interconnecting the upright portions 47 at the upper ends thereof. Preferably, the loop portions 42 are respectively positioned on the retaining ring 21 at diametrically opposed points thereon and are held in place by means of clamps or hands 49 wrapped about the folded portion 42 immediately beneath the retaining ring 21.

Figure 4:
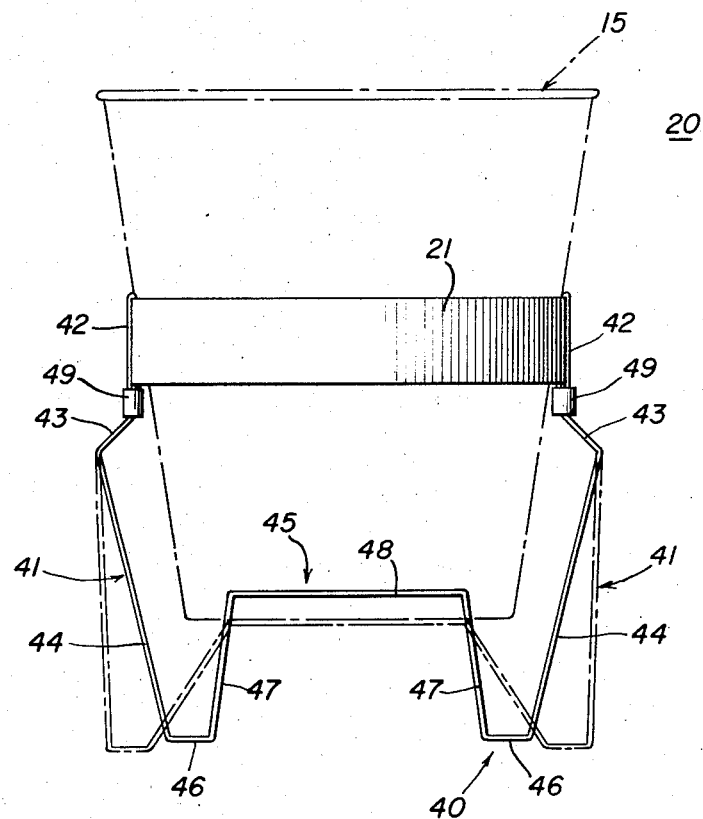
FIG. 4 is a front elevational view of a cup holder illustrated in FIG. 2, illustrating the flexure of the bottom support member when a cup is put thereon.

Referring now also to FIG. 4 of the drawings, the operation of the cup holder 20 will be described. When it is desired to support a cup 15 of beverage or the like on the inside of an automobile, the cup holder 20 is mounted on the inner door panel 10 by inserting the prongs 27 downwardly between the lip of the inner door ledge 12 and the window pane 13, with the mounting arms 23 overlying and engaging the door panel ledge 12, as illustrated in FIG. 2 of the drawings. When the window pane 13 is in the raised position thereof, illustrated in FIG. 2, the curved shape of the prongs 27 permits them to bear against the lip of the ledge 12, while the bent portions 25 of the arms 23 bear against the window pane 13 firmly to wedge the prongs 27 in place. When the window pane 13 is in the lowered position thereof, the recurved lower ends of the prongs 27 will engage the window pane 13 further to insure that the prongs 27 will firmly be held in place.

Next, the brace member 30 is slid outwardly along the mounting arms 23 until the legs 35 engage the inner surface of the door panel wall 11, for further firmly clamping the cup holder 20 in place on the door panel 10. The padding material 37 on the legs 35 will serve to protect the door panel wall 11, which may be upholstered, from damage by the legs 35.

With the cup holder 20 thus secured in place on the door panel 10, a cup 15 may be inserted within the retaining ring 21 for support by the bottom support member 40, as illustrated in FIGS. 2 and 4. It will be appreciated that, depending upon the shape of the cup 15, e.g., cylindrical, frusto-conical or the like, the downward travel of the cup 15 within the retaining ring 21 may be limited by engagement of the bottom of the cup with the bottom cross strap 48, or by engagement of the sides of the cup with the retaining ring 21. In any event, when the bottom of the cup 15 engages the cross piece 48 on the bottom support member 40, the weight of the cup 15 and its contents will serve to depress the cross strap 48, the hanger members 41 being displaced outwardly to accommodate the depression of the cross-strap 48 from the solid line position to the broken line position illustrated in FIG. 4. Thus, it is apparent that the cup holder 20 will readily accommodate cups of varying sizes and weights.

When not in use the cup holder 20 may be stored by clipping it on any available mount, such as the automobile sun visor, the distal ends of the brace member legs 35 serving as a resilient clip for accommodating the sun visor therebetween and gripping same. The outwardly curved ends 36 of the legs 35 facilitate the insertion of the sun visor between the legs 35.

Figure 5:
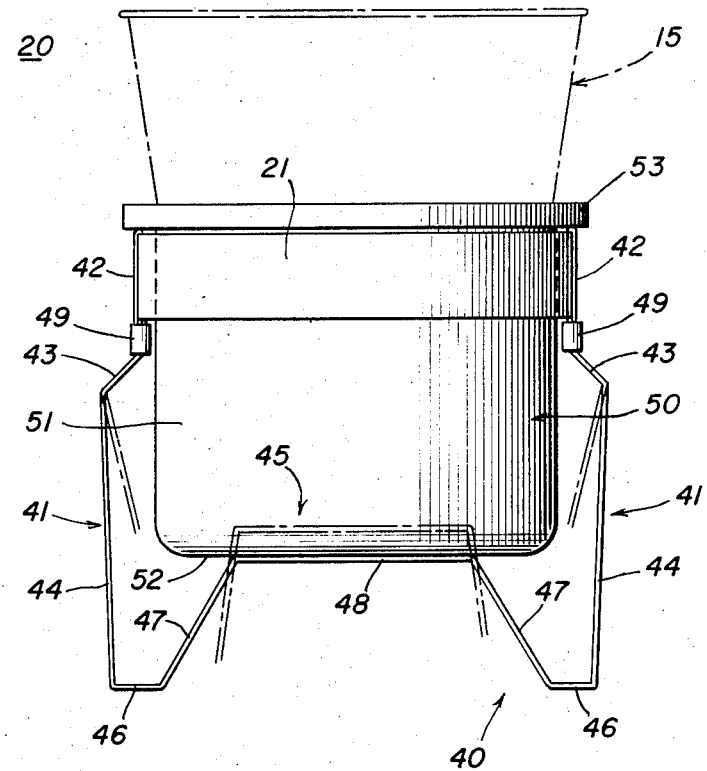
FIG. 5 is a front elevational view similar to FIG. 4, illustrating the use of a cup carrier with a rigid cylindrical container for providing a closed receptacle for the associated cup.

Referring now to FIG. 5 of the drawings, there is illustrated a rigid cup-like container, generally designated by the numeral 50, for use with the cup holder 20 of the present invention. The container 50 preferably includes a cylindrical encompassing side wall 51 substantially circular in transverse cross section and having a diameter slightly less than the inner diameter of the retaining ring 21, the side wall 51 being closed at one end thereof by a bottom end wall 52. Integral with the side wall 51 at the open end thereof and extending radially outwardly therefrom about the entire circumference thereof is an annular flange 53 having an outer diameter slightly greater than the diameter of the retaining ring 21.

In use, the container 50 is placed in the cup holder 20 by inserting the cylindrical side wall 51 within the retaining ring 21 with the flange 53 overlying the retaining ring 21 concentrically therewith for engagement therewith to support the container 50 in the cup holder 20. Depending upon the length of the cylindrical side wall 51, the bottom wall 52 may engage the cross strap 48 of the bottom support member 40, as illustrated in FIG. 5. Thus, it will be seen that the container 50 cooperates with the cup holder 20 to form a rigid closed receptacle for the associated cup 15, the container 50 serving to catch any spillage from the associated cup 15 and also serving to facilitate a stable support of cylindrical cups having bottoms of relatively small diameter. The container 50 is preferably integrally formed of a single piece of any suitable material. For example, the container 50 may be a suitably dimensioned plastic or metal cap from an exhausted aerosol container or the like.

In a typical constructional example of the cup holder 20 of the present invention, the retaining ring 21 is approximately 3 inches in diameter, the sloping portions 43 of the hanger members 41 are approximately ¼ inch in length, the side portions 44 are approximately 2-½ inches in length, the foot portions 46 are approximately ⅜ inch in length, the upright portions 47 approximately 1-⅛ inches, and the horizontal cross strap 48 is approximately 1-⅝ inches. It will, however, be appreciated that the cup holder 20 may be formed of any desired size, and suitable materials such as plastic or the like may be used for the construction of the cup holder 20.

From the foregoing, it will be seen that there has been provided a novel cup holder of simple and economical construction for mounting associated cups in the inside of automobile doors, the cup holder being characterized by a novel diamond-shaped brace member for securely clamping the cup holder on the automobile inside door panel.

In addition, there has been provided a novel cup holder of the character described, which includes an improved resilient and flexible bottom support member extending across the bottom of the cup holder for providing the sole bottom support for cups mounted therein.

Also, there has been provided an improved arrangement wherein the cup holder of the present invention is utilized in conjunction with a cylindrical closed container for providing a closed receptacle for the associated cups, to catch accidental spillage from the cups and provide a more stable cup support.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A carrier for a cup or the like adapted to be detachably mounted on an automobile door having a door panel and a window pane disposed on one side of the panel and spaced a predetermined distance therefrom, said carrier comprising a receptacle disposed in use for receiving and supporting therein an associated cup in an upstanding condition, a mounting arm disposed in use substantially horizontally and having an inner end coupled to said receptacle and a free distal end disposed away from said receptacle, a prong connected to said arm adjacent to said distal end thereof and extending downwardly therefrom, and a brace member slidably coupled to said arm intermediate the ends thereof and including a pair of generally V-shaped spaced-apart legs extending downwardly therefrom and disposed in a substantially diamond-shaped configuration, said brace member being movable longitudinally with respect to said arm for varying the spacing between said brace member and said prong, said carrier having a mounted configuration with said arm overlying the associated door panel and with said prong inserted downwardly between the window and the one side of the associated door panel and with said receptacle disposed on the opposite side of the associated door panel, said brace member being movable into engagement with the opposite side of the associated door panel for cooperation with said prong to accommodate the associated door panel therebetween, whereby said carrier may be firmly mounted on automobile doors having panels of varying thickness by appropriate adjustment of the position of said movable brace member.

2. The carrier set forth in claim 1, wherein said brace member is formed of an elongated flexible strip of steel looped over and engaging said mounting arm.

3. The carrier set forth in claim 1, and further including a protective covering on each of said legs for preventing damage to the associated door panel by said legs.

4. The carrier set forth in claim 1, wherein each of said legs terminates in an outwardly curved distal end, said distal ends being disposed closely adjacent to each other and diverging downwardly for accommodating clipping of said brace member on an associated mount to facilitate storage of the carrier when not in use.

5. A carrier for a cup or the like adapted to be detachably mounted on an automobile door, said carrier comprising a retaining ring disposed in use substantially horizontally for receiving coaxially therethrough an associated cup in an upstanding condition, mounting means coupled to said ring and extending outwardly therefrom for detachably mounting said ring on the associated door, and a flexible and resilient bottom support member coupled to said ring at a plurality of points thereon and extending therebeneath for supporting engagement with the bottom of an associated cup disposed within said retaining ring to provide the sole bottom support therefor, said bottom support member being shiftable among a plurality of different configurations for accommodating associated cups of various sizes and weights, whereby said bottom support member and said retaining ring cooperate to support the associated cup in an upstanding condition.

6. The carrier set forth in claim 5, wherein said bottom support member is integrally formed of a single strip of spring steel.

7. The carrier set forth in claim 5, wherein said bottom support member includes a pair of hanger portions respectively coupled to said retaining ring and depending therefrom, and a generally inverted U-shaped cross member interconnecting said hanger members at the lower ends thereof.

8. The carrier set forth in claim 5, and further including a generally cylindrical open-top container disposable in use within said retaining ring, said container having an annular flange extending outwardly therefrom at the open top thereof for engagement with the top of said retaining ring to support said container within said retaining ring, said container providing a closed receptacle for the associated cup.

9. A carrier for a cup or the like adapted to be detachably mounted on an automobile door, said carrier comprising a retaining ring disposed in use substantially horizontally for receiving coaxially therethrough an associated cup in an upstanding condition, mounting means coupled to said ring and extending outwardly therefrom for detachably mounting said ring on the associated door, and a container including a generally cylindrical side wall and an end wall closing said side wall at one end thereof and an annular flange extending outwardly from said side wall substantially normal thereto adjacent to the other end thereof, said container having an operative configuration with said cylindrical side wall disposed within said retaining ring substantially coaxially therewith and with said mounting flange overlying said retaining ring for engagement therewith for supporting said container on said retaining ring, whereby said retaining ring and said container cooperate to provide a closed receptacle for supporting an associated cup in an upstanding condition therein.

10. The carrier set forth in claim 9, wherein said container comprises a cap from a standard aerosol can.

11. A carrier for a cup or the like adapted to be detachably mounted on an automobile door having a door panel and a window pane disposed on one side of the panel and spaced a predetermined distance therefrom, said carrier comprising a retaining ring disposed in use substantially horizontally for receiving coaxially therethrough an associated cup in an upstanding condition, a mounting arm disposed in use substantially horizontally and having an inner end coupled to said retaining ring and a free distal end disposed away from said retaining ring, a prong connected to said arm adjacent to said distal end thereof and extending downwardly therefrom, and a brace member slidably coupled to said arm intermediate the ends thereof and including a pair of generally V-shaped spaced-apart legs extending downwardly therefrom and disposed in a substantially diamond-shaped configuration, said brace member being movable longitudinally with respect to said arm for varying the spacing between said brace member and said prong, said carrier having a mounted configuration with said arm overlying the associated door panel and with said prong inserted downwardly between the window and the one side of the associated door panel and with said receptacle disposed on the opposite side of the associated door panel, said brace member being movable into engagement with the opposite side of the associated door panel for cooperation with said prong to accommodate the associated door panel therebetween, a container including a generally cylindrical side wall and an end wall closing said side wall at one end thereof and an annular flange extending outwardly from said side wall substantially normal thereto adjacent to the other end thereof, said container having an operative configuration with said cylindrical side wall disposed within said retaining ring substantially coaxially therewith and with said mounting flange overlying said retaining ring for engagement therewith to support said container on said retaining ring, whereby said carrier may be firmly mounted on automobile doors having panels of varying thickness by appropriate adjustment of the position of said movable brace member with said retaining ring and said container cooperating to provide a closed receptacle for supporting an associated cup in an upstanding condition therein.

12. The carrier set forth in claim 11, and further including a pair of mounting arms coupled to said retaining ring, each of said mounting arms having a prong extending downwardly therefrom.

13. A carrier for a cup or the like adapted to be detachably mounted on an automobile door, said carrier comprising a retaining ring disposed in use substantially horizontally for receiving coaxially therethrough an associated cup in an upstanding condition, mounting means coupled to said ring and extending outwardly therefrom for detachably mounting said ring on the associated door, and a flexible and resilient bottom support member coupled to said ring at a plurality of points thereon and extending therebeneath for supporting engagement with the bottom of an associated cup disposed within said retaining ring to provide the sole bottom support therefor, said bottom support member including a pair of hanger portions respectively coupled to said retaining ring and depending therefrom, and a generally inverted U-shaped cross member interconnecting said hanger members at the lower ends thereof, said cross member including a pair of upstanding side portions respectively coupled at the lower ends thereof to the lower ends of said hanger members, and a flat substantially horizontally extending portion interconnecting said side members at the upper ends thereof, said bottom support member being shiftable among a plurality of different configurations for accommodating associated cups of various sizes and weights, whereby said bottom support member and said retaining ring cooperate to support the associated cup in an upstanding condition.

* * * * *